US007801512B1

(12) United States Patent
Myr

(10) Patent No.: US 7,801,512 B1
(45) Date of Patent: Sep. 21, 2010

(54) TRAFFIC SPEED ENFORCEMENT BASED ON WIRELESS PHONE NETWORK

(75) Inventor: David Myr, Jerusalem (IL)

(73) Assignee: Makor Issues and Rights Ltd., Jerusalem (IL)

( * ) Notice: Subject to any disclaimer, the term of this patent is extended or adjusted under 35 U.S.C. 154(b) by 0 days.

(21) Appl. No.: 12/398,699

(22) Filed: Mar. 5, 2009

(51) Int. Cl.

| | |
|---|---|
| ***H04M 3/42*** | (2006.01) |
| ***G08G 1/01*** | (2006.01) |
| ***G08G 1/017*** | (2006.01) |
| ***G08G 1/054*** | (2006.01) |
| ***G08G 1/123*** | (2006.01) |
| ***G08G 1/00*** | (2006.01) |
| ***G01S 13/08*** | (2006.01) |
| ***G06F 21/00*** | (2006.01) |
| ***H04W 36/00*** | (2009.01) |
| ***B60Q 1/54*** | (2006.01) |

(52) U.S. Cl. .................... 455/414.1; 340/936; 340/937; 340/466; 340/988; 701/119; 342/104; 705/53; 455/436

(58) Field of Classification Search ......... 340/936–937, 340/466, 988; 455/414.1, 436; 701/119; 342/104; 705/1, 4, 53
See application file for complete search history.

(56) References Cited

U.S. PATENT DOCUMENTS 4,591,823 A * 5/1986 Horvat ....................... 340/936
5,041,828 A 8/1991 Loeven
5,263,118 A 11/1993 Cornelison
5,327,144 A 7/1994 Stilp et al.
5,948,038 A 9/1999 Daly et al.
6,121,898 A * 9/2000 Moetteli ..................... 340/933

(Continued)

FOREIGN PATENT DOCUMENTS

EP 0476582 B1 3/1992

(Continued)

OTHER PUBLICATIONS

Polgreen, Lydia: "To Get the Phone, Drivers Are Willing to Risk Getting a Ticket", Sep. 2, 2003; NYTimes.com.*

(Continued)

*Primary Examiner*—Marivelisse Santiago-Cordero
(74) *Attorney, Agent, or Firm*—Gerry J. Elman; Elman Technology Law, P.C.

(57) ABSTRACT

The present invention includes systems and methods for detecting a speed limit violation based on the movement of a cell phone in a moving vehicle. The system and method determine whether a speeding violation has occurred based periodic cell phone location data, the time between a cell phone's presence at one location and the next, and the speed limit of the section of a section of road that the cell phone could be located on. Embodiments of systems and methods of the invention detect whether a moving vehicle may be part of a public transit system, in which case the corresponding cell phones are removed from consideration. The system and method also include generating a speeding ticket for a car determined to have violated a corresponding speed limit, keeping a record of a speeding violation, and sending a request to settle the ticket if it is not paid on time. Also included in the invention are embodiments of systems and methods that detect whether a cell phone moving in a car is in engaged in a call, and if so, generating a ticket for a driving-while-talking violation.

12 Claims, 8 Drawing Sheets

Detecting vehicles traveling over speed limit

U.S. PATENT DOCUMENTS

| | | | | |
|---|---|---|---|---|
| 6,188,329 | B1 | 2/2001 | Glier et al. | |
| 6,222,463 | B1 | 4/2001 | Rai | |
| 6,246,948 | B1 * | 6/2001 | Thakker | 701/93 |
| 6,339,740 | B1 | 1/2002 | Seto et al. | |
| 6,400,304 | B1 | 6/2002 | Chubbs, III | |
| 6,462,675 | B1 * | 10/2002 | Humphrey et al. | 340/905 |
| 6,466,862 | B1 | 10/2002 | DeKock et al. | |
| 6,502,053 | B1 | 12/2002 | Hardin et al. | |
| 6,515,596 | B2 | 2/2003 | Awada | |
| 6,577,946 | B2 | 6/2003 | Myr | |
| 6,720,889 | B2 | 4/2004 | Yamaki et al. | |
| 6,785,606 | B2 | 8/2004 | DeKock et al. | |
| 6,914,541 | B1 * | 7/2005 | Zierden | 340/937 |
| 6,970,102 | B2 | 11/2005 | Ciolli | |
| 6,975,931 | B2 | 12/2005 | Adachi | |
| 7,205,931 | B2 | 4/2007 | Gila et al. | |
| 7,269,387 | B2 | 9/2007 | Wolf et al. | |
| 7,308,247 | B2 * | 12/2007 | Thompson et al. | 455/404.2 |
| 7,603,311 | B1 * | 10/2009 | Yadav-Ranjan | 705/39 |
| 2002/0128000 | A1 | 9/2002 | do Nascimento, Jr. | |
| 2003/0100317 | A1 * | 5/2003 | Kaplan et al. | 455/456 |
| 2006/0055561 | A1 * | 3/2006 | Kamali et al. | 340/936 |
| 2006/0075023 | A1 | 4/2006 | Tenereillo | |
| 2006/0214783 | A1 | 9/2006 | Ratnakar | |
| 2007/0271020 | A1 | 11/2007 | Flanner et al. | |
| 2009/0262007 | A1 * | 10/2009 | Kelly | 342/104 |

FOREIGN PATENT DOCUMENTS

| | | | | |
|---|---|---|---|---|
| WO | WO 9601531 | A2 * | 1/1996 | |
| WO | 2008045157 | A2 | 4/2008 | |
| WO | 2008045196 | A2 | 4/2008 | |
| WO | 2008045407 | A2 | 4/2008 | |

OTHER PUBLICATIONS

"Dash Express" downloaded on Jul. 10, 2008 from http://www.dash.net/index.php.

"TomTom IQ Routes" downloaded on Jul. 10, 2008 from http://www.tomtom.com/whytomtom/topic.php?topic=5&subject=3.

"Trapster" downloaded on Jul. 14, 2008 from http://www.trapster.com/how-it-works.php.

Jack Stuster, Zail Coffman and Davey Warren; "Synthesis of Safety Research Related to Speed Limits", Publication No. FHWA-RD-98-154; Jul. 1998. Downloaded on Mar. 20, 2009 from http://www.tfhrc.gov/safety/speed/speed.htm.

G.B. Lee, J.H. Heo and J.S. Lee; "Vehicle Speed, Direction, ID Sensing for PRT", ACTA Press— Proceedings—Intelligent Systems and Control; 2007; Cambridge, MA, USA. Downloaded on Mar. 20, 2009 from http://www.actapress.com/Abstract.aspx?paperId=32169.

Huei-Yung Lin; "Vehicle Speed Detection and Identification from a Single Motion Blurred Image", Proceedings of the Seventh IEEE Workshop on Applications of Computer Vision (WACV/MOTION'05), Jan. 5-7, 2005. pp. 461-467. vol. 1. IEEE.

"True Position Location Platform" downloaded on Jan. 5, 2009 from http://www.trueposition.com/web/guest/trueposition-location-platform#.

"True Position Uplink Time Difference of Arrival" downloaded on Jan. 5, 2009 from http://www.trueposition.com/web/guest/trueposition-location-platform#.

"True Position LOCINT" downloaded on Jan. 5, 2009 from http://www.trueposition.com/web/guest/trueposition-location-platform#.

Safety-and-security-products, downloaded Mar. 20, 2009 from http://www.trueposition.com/web/guest/safety-and-security-products.

"Agilent E6474A, Wireless Network Optimization Platform," downloaded Mar. 20, 2009 from http://cp.literature.agilent.com/litweb/pdf/5988-3558EN.pdf.

"TEMS CellPlanner: Driving Network Excellence," downloaded on Apr. 2, 2009 from http://www.ericsson.com/solutions/tems/network_plan/downloads/TEMS_CellPlanner_8.1.pdf.

"TEMS News," downloaded on Mar. 9, 2009 from http://www.ericsson.com/solutions/tems/tems_news/no1_2008/ tems_cellplanner.html.

* cited by examiner

General System Overview

Obtaining cell phone location measurements

Digital Roadmap and Vehicle Type

Separating Between Cell Phones in Moving Private Vehicles and Other Cell Phones

Detecting vehicles traveling over speed limit

Speeding Violations Database

Base Station Handoff

Base Station Handoff - Maximal Speed Calculation

| | | ROAD A | ROAD B |
|---|---|---|---|
| 701 | DISTANCE | D1 | D2 |
| 702 | SPEED LIMITS | SL1 | SL2 |
| 703 | SPEED CALCULATION | D1/SL1 | D2/SL2 |
| 704 | CHECK? | D1/SL1 <> D2/SL2 | |

Fig. 7b
Base Station Handoff –
Maximal Speed Calculation

TRAFFIC SPEED ENFORCEMENT BASED ON WIRELESS PHONE NETWORK

BACKGROUND OF THE INVENTION

The present invention relates to the enforcement of speed limits on vehicles traveling on roadways.

With a constant increase in the number of vehicles, the number of accidents has increased dramatically. Speeding is widely recognized as the number one cause of road accidents and fatalities every year. An article published by the U.S. Department of Transportation's Federal Highway Administration named "Synthesis of Safety Research Related to Speed and Speed Limits" provides a summary of speeding-related road accidents. The summary states:

That the evidence shows that the risk of having a crash is increased for vehicles traveling above the average speed.

That the risk of being injured increases exponentially with speeds much faster than the median speed.

That the severity of a crash depends on the vehicle speed change at impact.

Problems in traffic speed control and traffic violations have been studied extensively over the last few decades. A number of devices have been introduced to improve the detection and prosecution of traffic violations. The use of radar devices to detect and record vehicle speed began in the 1950s. From a stationary base station, radar waves are emitted and are back-scattered by a mobile object. Video cameras were introduced a little later to capture sequential images to document traffic speed violations.

Currently, most conventional attempts for real-time traffic speed control and detection use a wheel-speed measuring device, are Doppler-radar based, laser based or use road sensors of some kind. Unfortunately, those means are not always accurate and sometimes require a human operator. Radar-based and laser-based systems are known in particular for their inaccuracy.

As an example of vehicle speed being measured by calculating detection values from wheel speed sensors, Seto in his U.S. Pat. No. 6,339,740 disclosed a machine for detecting vehicle traffic offenses. This machine comprises a speed-detection means for measuring the speed of transit of a vehicle along a carriageway by detecting the interception of a beam or field by the front or rear of the vehicle, said speed detection means being arranged on a side of the carriageway and camera means for capturing an image of the vehicle, said camera means being connected to said speed detection means and to said carriageway transverse position detection means, said camera means being controlled as a function of said traverse position.

For another example, Adachi in his U.S. Pat. No. 6,975,931 describes a system for measuring speed according to regular speed measuring methods available in all the vehicles today, receiving that data and for setting maximal speed limits according to speed limits used in different countries.

For yet another example, Yoshino in his European Patent EP0476582 discloses an apparatus for detecting motorcycles' speed based on a front wheel speed and a rear wheel speed, and applying antilock brake control to each of front and rear wheels based on a calculated estimated vehicle speed. The apparatus includes a memory for storing the estimated vehicle speed at the time an application of antilock brake control to either the front or rear wheel is started, or an application of brakes to either the front or rear wheel starts. The apparatus further includes a calculation unit for comparing the front wheel speed and the rear wheel speed to calculate the estimated vehicle speed based on the higher of the front wheel speed or the rear wheel speed, while antilock brake control is applied to the front or rear wheel or either a front brake or a rear brake is applied.

Sensor-based vehicle speed detection systems provide another part of the prior art. An example of such a system can be viewed in the paper named "Vehicle Speed, Direction, ID Sensing for PRT" by G. B. Lee, J. H. Heo, and J. S. Lee (Korea). This paper presents the vehicle speed, direction, identification sensing methods for vehicle speed determination. The speed of the vehicles is measured using different proximity sensors, wherein two proximity sensors are utilized to detect the direction of the vehicle and to measure the speed of the vehicle.

Camera-based vehicle speed-detection systems constitute yet another part of the prior art. An example of such a system can be viewed in the paper named: "Vehicle Speed Detection and Identification from a Single Motion Blurred Image." Proceedings of the Seventh IEEE Workshops on Application of Computer Vision (WACV/MOTION'05)—Volume 1, 5-7 Jan. 2005. Pages: 461-467.

The paper discloses a system in which motion blur is a result of finite acquisition time of practical cameras and the relative motion between the camera and moving objects. The paper presents an improvement over RADAR-based devices. In the paper, Lin produces a novel approach in which the motion blur parameters are estimated from a single motion blurred image and the length of motion blur is used for image restoration. The restored image is then used to obtain other parameters for vehicle speed estimation. The images taken with the vehicle's license plates are used for both the assistance of image restoration and the identification of the vehicle. The author reports to have established a link between the motion-blur information of a 2D image and the speed information of a moving object. The paper further states that experiments have shown the results of less than 2% error for both local and highway traffic compared to video-based speed estimation methods.

RADAR-based vehicle speed detection systems constitute yet another part of the prior art. Chubbs, in his U.S. Pat. No. 6,400,304, presents a system that combines a global positioning satellite (GPS) system and a radar detection unit, in wireless communication with the GPU, for tracking and determining the speed of a vehicle. The system may be manually activated, or more preferably, activated by an external source of radar signals, such as may be emitted by a police "speed trap." The unit includes means for recording and storing speed data of the vehicle, and to alerting the operator of the vehicle to a "speed trap" situation.

Another example of using a GPS device to determine speed of the vehicle is shown by Flanner in U.S. Patent Application Publication 2007/0271020 for "Motor vehicle speed detection and control system." Flanner discloses a GPS-based system disposed within a motor vehicle configured to measure the geographic coordinates of the vehicle in order to calculate and adjust and maintain the current speed of the vehicle to correspond to the speed limit of the determined geographic coordinate. The system further includes a database that contains roadmaps and corresponding speed limit data. A coordinate-determination system calculates the current geographic coordinate of the vehicle to calculate the current speed data of the vehicle and subsequently performs an algorithm to compare the current-speed data with the speed-limit data stored in the database for the current geographic coordinate.

U.S. Pat. Nos. 6,466,862 and 6,785,606 disclose a combination of video cameras, road-mounted pressure sensors, GPS receivers, and cell phone signal triangulation to determine the locations and speeds of vehicles moving along roads. These patents disclose systems for providing traffic flow information to vehicle operators and do not contemplate law enforcement applications such as determining whether vehicles are moving faster than corresponding speed limits or issuing tickets for traffic violations.

A couple of patents disclose determining the distance between a cellular base station and a moving object. Neither provides speed estimates nor deals with traffic violation based on those estimates. For one, U.S. Pat. No. 7,205,931 discloses a method for determining the distance between a base station (SLG) and a mobile object (DT1-DT3). The reference also discloses a base station and identification system for a method of this type. As disclosed in the abstract of the reference, A HF carrier frequency and an offset frequency (df) are predetermined for a QAM modulation. The HF carrier frequency is increased and decreased by the offset frequency in sequence over time in such a way that the HF carrier base frequencies (fo+df, fo−df) result in an HF carrier signal (TS) thus modulated to exhibit an identical phase when the frequency is changed. The HF carrier signal is subsequently transmitted and simultaneously mixed (MIX) with an HF carrier signal (RS) that has been backscattered by the mobile object to obtain a carrier phase signal (PS). The corresponding carrier phase (PH1, PH2) for the two HF carrier base frequencies is determined in sequence over time. The difference (dPH) between these phases is used to calculate the distance between the base station and the respective mobile object.

U.S. Pat. No. 7,269,387, named: "Method and apparatus for determining a distance between a base station and a mobile unit," provides a method and an apparatus for determining a first estimate of a distance traveled by a signal on a wireless communication link between the base station and the mobile unit, determining a second estimate of the distance traveled by the signal on the wireless communication link between the base station and the mobile unit, and comparing the first and second estimates.

Additionally, the company TruePosition, Inc. offers products for tracking the locations of cellular phones based only on their wireless signal, without aid from GPS. One product, the TruePosition Location Platform is widely used in the United States by AT&T and T-Mobile to meet the FCC's E-911 requirements of detecting the location of a cell phone for dispatch of emergency services. The TruePosition Location Platform uses Uplink Time Difference of Arrival techniques, disclosed in U.S. Pat. No. 5,327,144 which is incorporated herein by reference, as a source for obtaining the location of a cell phone based on a normal cellular signal. The Platform can be supplemented with location data obtained through Angle of Arrival techniques, which are discussed later in this specification. Another product, TruePosition LOCINT, collects, stores, analyzes, and displays historical and real-time wireless events and location of targeted cell phone users.

Over the years, devices have been introduced to improve the detection, documentation, and prosecution of traffic violations. Recently, a number of unmanned-camera-based and radar-based systems for detection and documentation of speeding have been installed. These systems produce visual images of the speeding offense, those images to be processed later by police personnel, producing speeding tickets, which are mailed to the registered owner of the vehicle. However, all the devices and processes still require police personnel attention to process each traffic violation. Police personnel efforts are not only time-consuming but also expensive.

SUMMARY OF THE INVENTION

The present invention provides a precise automatic speeding-detection system for automotive vehicles that functions automatically. It is pervasive in that speeding is detected without the use of personnel or systems limited at any time to particular locations on the ground or in aircraft.

Traffic-violation enforcement typically has been and is increasingly costly and labor-intensive. Accordingly, it's an advantage of the present invention to provide a relatively inexpensive and easy-to-use method of detecting speeding of a vehicle. Additionally, an improved quality and quantity of speeding detections will provide governmental agencies with an ability to generate more speeding violation tickets, leading to more revenue for those agencies, while correspondingly encouraging drivers to modify their behavior to avoid such speeding tickets.

One aspect of the invention is a method for detecting traffic speed violations, in which signals obtained from cellular phones in moving vehicles provide time and location information for determining if a corresponding vehicle's speed is above a maximum speed limit for any particular section of a road, comprising:

a. obtaining a cell phone location record on a cell phone in a regional network;

b. periodically obtaining new cell phone location records on the cell phone in a specific real time frame;

c. determining whether the cell phone is located in a traveling vehicle, and adding the cell phone to a list of cell phones that are determined to be located in traveling vehicles;

d. for each location record of steps "a" and "b" for a cell phone in the list of step "c" virtually positioning the cell phone onto a road section corresponding to coordinates from the location record;

e. identifying groups of cell phones from the list that are grouped together in a single moving vehicle and eliminating those cell phones from the list;

f. for a cell phone remaining in the list, determining the speed of the vehicle in which the cell phone is located by analyzing a series of recently recorded cell phone-based positions and relating them to corresponding road sections;

g. for a vehicle of step "f," determining if the vehicle has traveled along a road section at a speed above a maximum speed limit of the road section;

h. for a vehicle traveling at a speed above a corresponding maximum speed limit, generating a speeding violation ticket; and i. maintaining a database of speeding violations for a vehicle of step "h" that is registered, determining if a certain speeding ticket has not been paid in time, and sending a request to settle the ticket.

By "virtually positioning," I mean generating a record identifying the current geographic location of the cell phone, e.g. employing a coordinate system corresponding to that used for a pertinent digital roadmap of the pertinent area. The cell phone is superimposed on the digital map over a digital map point corresponding to the location of the cell phone. Some embodiments may visually display the digital map and the virtual position of the cell phone, while other embodiments do not.

Another aspect of the invention is the method described above, further comprising interfacing with a digital roadmaps database that contains a digital roadmap with corresponding speed limits data for road sections to determine the speed limit at the location of the geographic coordinates of the vehicle.

Another aspect of the invention is a method for detecting the speed of a moving vehicle through measurements of cellular phone location data obtained through wireless handoff optimization measurements at specific time intervals, and determining if the vehicle's speed is above a maximum speed limit for any particular section of a road, comprising:

a. generating a list of cell phones located at each cell of a wireless network;

b. determining, for a cell phone in the list of step "a," when the cell phone has performed a handoff process due to moving from one cell in the wireless network to another cell in the wireless network;

c. determining, for a cell phone in the list of step "a," the time of a handoff process following the handoff process of step "b";

d. for a cell phone in the list that performed the handoff processes of steps "b" and "c," virtually positioning the cell phone onto each of all road sections that the cell phone could have been located on between points at which the handoff processes of steps "b" and "c" could have occurred;

e. for a cell phone in the list that performed the handoff processes of steps "b" and "c," determining the distances between all points where the handoffs of steps "b" and "c" could have occurred along the road sections of step "d";

f. for a cell phone in the list that performed the handoff processes of steps "b" and "c," obtaining from a speed limits database the maximum speed limit for the road sections of step "d";

g. obtaining a number representing the minimum length of time in which the moving vehicle corresponding to a cell phone of step "f" could travel the distance between two handoff points of step "e" in compliance with said maximum speed limits, wherein the number is obtained from a real-time calculation of the minimum ratio of the distances of step "e" to the maximum speed limits of step "f," or from a database containing the pre-calculated result of said calculation;

h. comparing the actual time between handoffs in steps "b" and "c" with the minimum length of time of step "g" to determine if the moving vehicle is traveling at a speed above a corresponding maximum speed limit;

i. identifying cell phones that are grouped together in a single moving vehicle and eliminating those cell phones from the list;

j. for a vehicle corresponding to a cell phone in the list and traveling at a speed above a corresponding maximum speed limit, generating a speeding violation ticket; and k. maintaining a database of speeding violations for a vehicle of step "j" that is registered, determining if a certain speeding ticket has not been paid in time, and sending a request to settle the ticket.

In certain implementations of the invention, the vehicle speed data is wirelessly transmitted to a law enforcement agency.

In another aspect of the invention, the methods described above further comprise recording a corresponding cell phone number, license plate number, formal vehicle registration number, or VIN of a vehicle containing a cell phone and traveling at a speed above a corresponding maximum speed limit, and keeping such a record for a period of time.

In yet another aspect of the invention, the methods described above further comprise sending the speeding violation ticket to the registered owner of the corresponding vehicle, and keeping a record of sending the speeding ticket for a period of time.

In another aspect of the invention, the above-described methods further comprise checking if a driver of a car that committed a speeding violation was also speaking on a phone in the same time period in which the driver committed a speeding violation, and generating a driving-while-speaking traffic violation ticket for the driver.

Another aspect of the invention is a system for detecting traffic speed violations, in which signals obtained from cellular phones in moving vehicles provide time and location information for determining if a corresponding vehicle's speed is above a maximum speed limit for any particular section of a road, comprising:

a. means for obtaining a cell phone location record on a cell phone in a regional network;

b. means for periodically obtaining new cell phone location records on the cell phone in a specific real time frame;

c. means for determining whether the cell phone is located in a traveling vehicle and for adding the cell phone to a list of cell phones that are determined to be located in a traveling vehicles;

d. means for, for each cell phone location record for a cell phone in the list, virtually positioning the cell phone onto a road section corresponding to coordinates from the location record;

e. means for identifying groups of cell phones from the list that are grouped together in a single moving vehicle and eliminating those cell phones from the list;

f. means for determining, for a cell phone remaining in the list, the speed of the vehicle in which the cell phone is located by analyzing a series of recently recorded cell phone-based positions and relating them to corresponding road sections;

g. means for determining, for a vehicle of part "f," if the vehicle has traveled along a road section at a speed above a maximum speed limit of the road section;

h. means for generating a speeding violation ticket for a vehicle traveling at a speed above a corresponding maximum speed limit; and i. means for maintaining a database of speeding violations for a vehicle ticketed in accordance with part "h" that is registered, determining if a certain speeding ticket has not been paid in time, and sending a request to settle the ticket.

Another aspect of the invention is the system described above, further comprising:

a digital roadmaps database that contains a digital roadmap with corresponding speed limits data for road sections; and means for interfacing with the digital roadmaps database to determine the speed limit at the location of the geographic coordinates of the vehicle.

Another aspect of the invention is a system for detecting the speed of a moving vehicle through measurements of cellular phone location data obtained through wireless handoff optimization measurements at specific time intervals, and determining if the vehicle's speed is above a maximum speed limit for any particular section of a road, comprising:

a. means for generating a list of cell phones located at each cell of a wireless network;

b. means for determining, for a cell phone in the list of part "a," when the cell phone has performed a handoff process due to moving from one cell in the wireless network to another cell in the wireless network;

c. means for determining, for a cell phone in the list of part "a," the time of a handoff process following the handoff process of part "b";

d. means for, for a cell phone in the list that performed the handoff processes of parts "b" and "c," virtually positioning the cell phone onto each of all road sections that the cell phone could have been located on between points at which the handoff processes of parts “b” and “c” could have occurred;

e. means for, for a cell phone in the list that performed the handoff processes of parts “b” and “c,” determining the distances between all points where the handoffs of parts “b” and “c” could have occurred along the road sections of part “d”;

f. means for, for a cell phone in the list that performed the handoff processes of parts “b” and “c,” obtaining from a speed limits database the maximum speed limit for the road sections of parts “d”;

g. means for obtaining a number representing the minimum length of time in which the moving vehicle corresponding to a cell phone of part “f” could travel the distance between two handoff points of part “e” in compliance with said maximum speed limits, wherein the number is obtained from a real-time calculation of the minimum ratio of the distances of part “e” to the maximum speed limits of part “f,” or from a database containing the pre-calculated result of said calculation;

h. means for comparing the actual time between handoffs in parts “b” and “c” with the minimum length of time of part “g” to determine if the moving vehicle is traveling at a speed above a corresponding maximum speed limit;

i. means for identifying cell phones that are grouped together in a single moving vehicle and eliminating those cell phones from the list;

j. means for, for a vehicle corresponding to a cell phone in the list and traveling at a speed above a corresponding maximum speed limit, generating a speeding violation ticket; and k. means for maintaining a database of speeding violations for a vehicle of part “j” that is registered, determining if a certain speeding ticket has not been paid in time, and sending a request to settle the ticket.

Another aspect of the invention is a system as described above, further comprising means for wirelessly transmitting vehicle speed data.

Another aspect of the invention is a system as described above, further comprising means for recording a corresponding cell phone number, license plate number, formal vehicle registration number, or VIN of a vehicle containing a cell phone and traveling at a speed above a corresponding maximum speed limit, and keeping such a record for a period of time.

In another aspect of the invention, the above-described systems further comprise means for sending the speeding violation ticket to the registered owner of the corresponding vehicle, and keeping a record of sending the speeding ticket for a period of time.

Another aspect of the invention is a system as described above, further comprising means for checking if a driver of a car that committed a speeding violation was also speaking on a phone in the same time period in which the driver committed a speeding violation, and generating a driving-while-speaking traffic violation ticket for the driver.

Another aspect of the invention is a method for detecting traffic speed violations, in which signals obtained from cellular phones in moving vehicles provide time and location information for determining if a corresponding vehicle’s speed is above a maximum speed limit for any particular section of a road, comprising:

a. obtaining a cell phone location record on a cell phone in a regional network;

b. periodically obtaining new cell phone location records on the cell phone in a specific real time frame;

c. determining whether the cell phone is located in a traveling vehicle, and adding the cell phone to a list of cell phones that are determined to be located in traveling vehicles;

d. for each location record of steps “a” and “b” for a cell phone in the list of step “c” virtually positioning the cell phone onto a road section corresponding to coordinates from the location record;

e. identifying groups of cell phones from the list that are grouped together in a single moving vehicle and eliminating those cell phones from the list;

f. for a cell phone remaining in the list, determining the speed of the vehicle in which the cell phone is located by analyzing a series of recently recorded cell phone-based positions and relating them to corresponding road sections;

g. for a vehicle of step “f,” determining if the vehicle has traveled along a road section at a speed above a maximum speed limit of the road section and adding a corresponding cell phone number, license plate number, formal vehicle registration number, or VIN of the vehicle to a list representing speeding vehicles; and h. transmitting said list of speeding vehicles to a third party.

Another aspect of the invention is a method for detecting the speed of a moving vehicle through measurements of cellular phone location data obtained through wireless handoff optimization measurements at specific time intervals, and determining if the vehicle’s speed is above a maximum speed limit for any particular section of a road, comprising:

a. generating a list of cell phones located at each cell of a wireless network;

b. determining, for a cell phone in the list of step “a,” when the cell phone has performed a handoff process due to moving from one cell in the wireless network to another cell in the wireless network;

c. determining, for a cell phone in the list of step “a,” the time of a handoff process following the handoff process of step “b”;

d. for a cell phone in the list that performed the handoff processes of steps “b” and “c,” virtually positioning the cell phone onto each of all road sections that the cell phone could have been located on between points at which the handoff processes of steps “b” and “c” could have occurred;

e. for a cell phone in the list that performed the handoff processes of steps “b” and “c,” determining the distances between all points where the handoffs of steps “b” and “c” could have occurred along the road sections of step “d”;

f. for a cell phone in the list that performed the handoff processes of steps “b” and “c,” obtaining from a speed limits database the maximum speed limit for the road sections of step “d”;

g. obtaining a number representing the minimum length of time in which the moving vehicle corresponding to a cell phone of step “f” could travel the distance between two handoff points of step “e” in compliance with said maximum speed limits, wherein the number is obtained from a real-time calculation of the minimum ratio of the distances of step “e” to the maximum speed limits of step “f,” or from a database containing the pre-calculated result of said calculation;

h. comparing the actual time between handoffs in steps “b” and “c” with the minimum length of time of step “g” to determine if the moving vehicle is traveling at a speed above a corresponding maximum speed limit;

i. identifying cell phones that are grouped together in a single moving vehicle and eliminating those cell phones from the list;

j. for a vehicle corresponding to a cell phone in the list and traveling at a speed above a corresponding maximum speed limit, adding a corresponding cell phone number, license plate number, formal vehicle registration number, or VIN of the vehicle to a list representing speeding vehicles; and k. transmitting said list of speeding vehicles to a third party.

Another aspect of the invention is a method for receiving data pertaining to, generating tickets for, and maintaining records of traffic speed violations, in which signals obtained from cellular phones in moving vehicles provide time and location information for determining if a corresponding vehicle's speed is above a maximum speed limit for any particular section of a road, comprising:

a. receiving a list comprising a cell phone number, license plate number, formal vehicle registration number, or VIN corresponding to a vehicle containing a cell phone, wherein the vehicle moved along a road section at a speed above the speed limit of the road section;

b. generating a speeding violation ticket for a vehicle of step "a;" and c. maintaining a database of speeding violations for a vehicle of step "b," determining if a certain speeding ticket has not been paid in time, and sending a request to settle the ticket.

Another aspect of the invention is a system for detecting traffic speed violations, in which signals obtained from cellular phones in moving vehicles provide time and location information for determining if a corresponding vehicle's speed is above a maximum speed limit for any particular section of a road, comprising:

a. means for obtaining a cell phone location record on a cell phone in a regional network;

b. means for periodically obtaining new cell phone location records on the cell phone in a specific real time frame;

c. means for determining whether the cell phone is located in a traveling vehicle and for adding the cell phone to a list of cell phones that are determined to be located in a traveling vehicles;

d. means for, for each cell phone location record for a cell phone in the list, virtually positioning the cell phone onto a road section corresponding to coordinates from the location record;

e. means for identifying groups of cell phones from the list that are grouped together in a single moving vehicle and eliminating those cell phones from the list;

f. means for determining, for a cell phone remaining in the list, the speed of the vehicle in which the cell phone is located by analyzing a series of recently recorded cell phone-based positions and relating them to corresponding road sections;

g. means for determining, for a vehicle of part "f," if the vehicle has traveled along a road section at a speed above a maximum speed limit of the road section and if so, adding a corresponding cell phone number, license plate number, formal vehicle registration number, or VIN of the vehicle to a list representing speeding vehicles; and h. means for transmitting said list of speeding vehicles to a third party.

Another aspect of the invention is a system for detecting the speed of a moving vehicle through measurements of cellular phone location data obtained through wireless handoff optimization measurements at specific time intervals, and determining if the vehicle's speed is above a maximum speed limit for any particular section of a road, comprising:

a. means for generating a list of cell phones located at each cell of a wireless network;

b. means for determining, for a cell phone in the list of part "a," when the cell phone has performed a handoff process due to moving from one cell in the wireless network to another cell in the wireless network;

c. means for determining, for a cell phone in the list of part "a," the time of a handoff process following the handoff process of part "b";

d. means for, for a cell phone in the list that performed the handoff processes of parts "b" and "c," virtually positioning the cell phone onto each of all road sections that the cell phone could have been located on between points at which the handoff processes of parts "b" and "c" could have occurred;

e. means for, for a cell phone in the list that performed the handoff processes of parts "b" and "c," determining the distances between all points where the handoffs of parts "b" and "c" could have occurred along the road sections of part "d";

f. means for, for a cell phone in the list that performed the handoff processes of parts "b" and "c," obtaining from a speed limits database the maximum speed limit for the road sections of parts "d";

g. means for obtaining a number representing the minimum length of time in which the moving vehicle corresponding to a cell phone of part "f" could travel the distance between two handoff points of part "e" in compliance with said maximum speed limits, wherein the number is obtained from a real-time calculation of the minimum ratio of the distances of part "e" to the maximum speed limits of part "f," or from a database containing the pre-calculated result of said calculation;

h. means for comparing the actual time between handoffs in parts "b" and "c" with the minimum length of time of part "g" to determine if the moving vehicle is traveling at a speed above a corresponding maximum speed limit;

i. means for identifying cell phones that are grouped together in a single moving vehicle and eliminating those cell phones from the list;

j. means for, for a vehicle corresponding to a cell phone in the list and traveling at a speed above a corresponding maximum speed limit, adding a corresponding cell phone number, license plate number, formal vehicle registration number, or VIN of the vehicle to a list representing speeding vehicles; and k. means for transmitting said list of speeding vehicles to a third party.

Another aspect of the invention is a system for receiving data pertaining to, generating tickets for, and maintaining records of traffic speed violations, in which signals obtained from cellular phones in moving vehicles provide time and location information for determining if a corresponding vehicle's speed is above a maximum speed limit for any particular section of a road, comprising:

a. receiving a list comprising a cell phone number, license plate number, formal vehicle registration number, or VIN corresponding to a vehicle containing a cell phone, wherein the vehicle moved along a road section at a speed above the speed limit of the road section;

b. means for generating a speeding violation ticket for a vehicle of part "a;" and c. means for maintaining a database of speeding violations for a vehicle ticketed in accordance with part "b," determining if a certain speeding ticket has not been paid in time, and sending a request to settle the ticket.

In the aspects of the invention in which a list representing vehicles determined to be moving above corresponding speed limits is generated and transmitted to a third party, the list may be transmitted in paper format, on a computer disc, or through an electronic data network. The generation of a speeding ticket could be performed by a general purpose computer programmed with special instructions to communicate with a printer that is either directly connected or connected through a network, to print out speeding tickets on paper, in a format that matches speeding tickets commonly used for speeding and other traffic violations. A speeding ticket could also be generated in electronic format by instead printing the ticket to a "virtual printer," which is a set of processor executable instructions in the memory of a computer that receive data formatted for a physical printer and reformat and direct the contents to a file, such as a PDF, which is human-readable and capable of being electronically sent from one computer to another.

Unless otherwise specified, the transmitting, sending, and receiving of data and other items could be accomplished by machine, such as one computer in communication with another computer via a direct, point to point connection, local area network, a wide area network, or the Internet. It is to be understood that the network could be wired or wireless. Further, as people having ordinary skill in the art of electronic data communications, the data and other items could be encoded using TCP/IP, UDP, or a similar protocol. A computer could be a general purpose computer containing, in its memory, special instructions for carrying out the steps of formatting data appropriate for the communication protocol through which it sends and receives data with another computer and where the communication takes place over a network, instructing a network adapter to transmit and receive data over a specified port, to a recipient computer identified by an numeric, alphabetical, or alphanumeric code.

These and other aspects of the present invention will become readily apparent from the following description taken in conjunction with the accompanying drawings.

BRIEF DESCRIPTION OF THE DRAWINGS

FIG. 7*b* graphically illustrates how maximal speed is calculated using the base station handoff process.

DETAILED DESCRIPTION

This invention provides an automatic real time traffic speed detection method and system based on wireless phone network which is capable of determining a minimum speed at which a particular vehicle may be moving, comparing the detected speed with the speed limit for the certain segment of road on which the vehicle is traveling, determining if the vehicle is moving over the maximal speed limit and if so, either generating a speeding violation ticket to the owner of the vehicle or transmitting information for generating such a ticket to a traffic-enforcement agency.

The present invention utilizes a cell phone network in which the data from moving vehicles are collected continuously and input into the system. This eliminates the need for developing a dedicated mobile wireless information-gathering fleet and other high-cost devices requiring large capital investments and considerable work force.

There are two main systems and methods of obtaining cell phone location and speed disclosed herein:

1. Regular Method Location Measurements

Obtaining Cell Phone Records from the Network Operator

Figure 1:
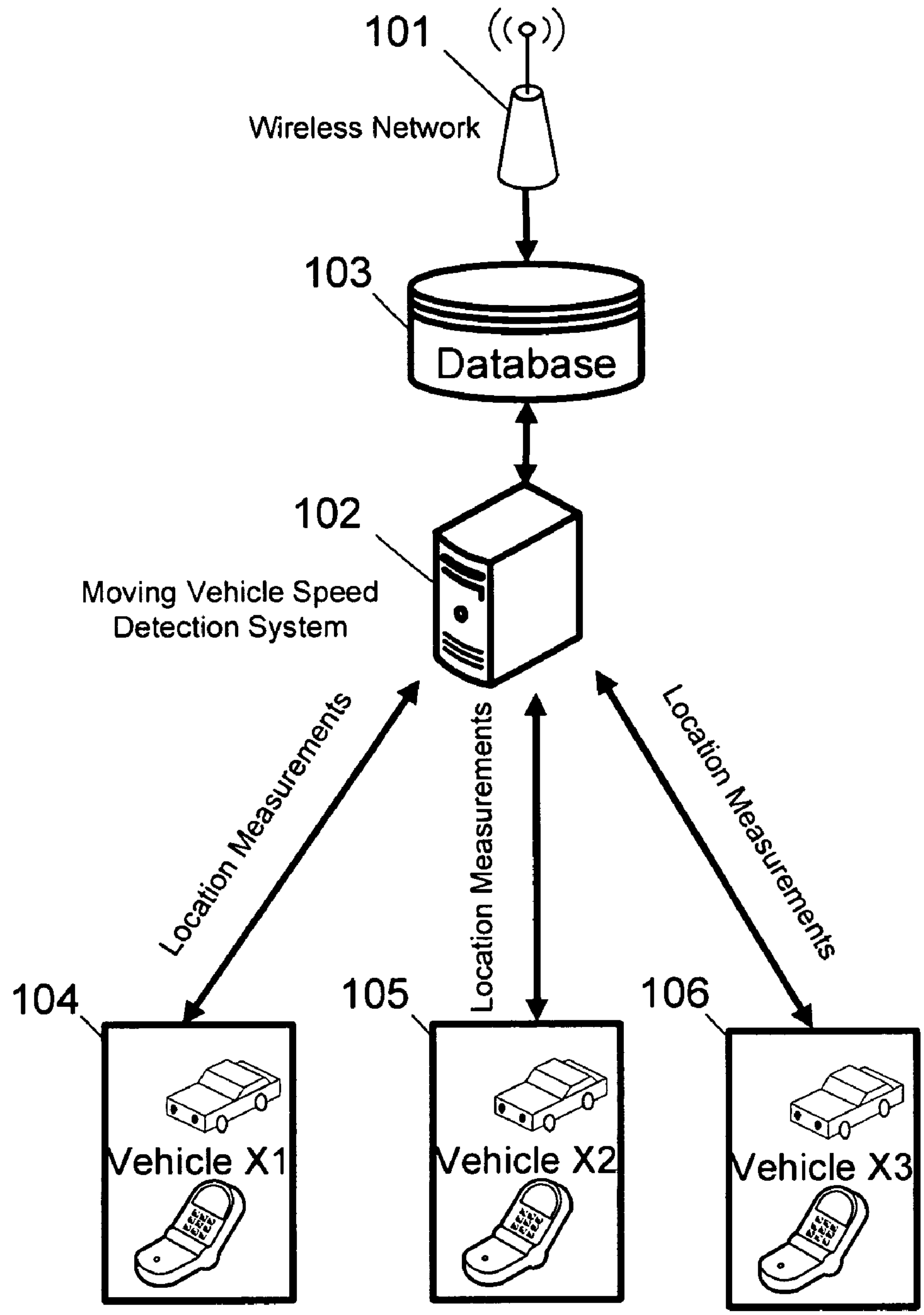
FIG. 1 provides a general overview of the invented system.

This embodiment of the invention uses wireless networks as the sole means to provide precise location information (FIG. 1, item 101). Technologically, this may be achieved by measuring the distances the signals travel between a moving wireless (cellular) phone and a fixed set of base stations, and the times these signals take to travel. Mathematical and statistical methods may then be applied to this information, and the resulting equations are solved by a computer to determine location and speed.

This approach takes advantage of improved accuracy of location measurement methods. Furthermore, any modifications necessary to achieve such accuracy, such as specialized location equipment, can be made on the network rather than on the handsets.

In the invention, signals obtained from vehicular-based cellular phones provide speed information on moving vehicles, are input into a Moving Vehicle Speed Detection system (102), and are stored in the system database (103) as records with speed information. The Moving Vehicle Speed Detection system includes a central processing unit, memory containing instructions for executable by the central processing unit for carrying out the algorithms described herein, memory for storing data and results of calculations, and a computer network interface for a wired or wireless network for receiving and sending data.

It is assumed that the cell phone network operator is capable of providing all the necessary information on the plurality of active cell phone units in the network. The process of collecting and transmitting cell phone position data is well known to those skilled in the art and described in the literature. This topic is discussed below.

For the purposes of the present invention, it is contemplated that the location data is received in the form of periodic data packets in real time (104, 105, and 106). This data is sent to the Moving Vehicle Speed Detection system through a computer network, and received by its computer network interface. The data from the packets are assembled into a file in the memory of the Moving Vehicle Speed Detection system. The exemplary data packet, received in step 201 of FIG. 2, consists of one or more records, each record for a single cell phone, containing the phone's unique ID number, such as the electronic serial number (ESN) and/or mobile identification number (MIN), the recorded time of signal reception t, and its location coordinates P (x, y). As mentioned above, once received, the packets are assembled in a list in a packet file in the memory of the Moving Vehicle Speed Detection system.

It is known to those skilled in the art that a unique phone ID can be correlated to identifying information for the owner of the phone, using the customer database of the cellular network provider whose service the phone owner subscribes to. This uniquely identifying information, which contains a name, address, phone number, and, in some implementations, the social security number of the phone owner, can be cross-referenced against a database of vehicle registrations to obtain the registration number of a speeding vehicle. By "registration number" I mean an identifier of a particular vehicle, which may in various implementations of this invention be the license plate identifier of the vehicle, the vehicle identification number (VIN) generated when the vehicle is made, or a "title" number generated by the state when its ownership is recorded.

Basically, a base station can determine how far a mobile phone is from the base station by measuring the received signal and determining the drop in its strength.

Nominal distance is inversely proportional to the square of signal strength multiplied by the loss factor and other attenuation factors. Higher signal strength means the mobile is closer to the receiver. By increasing receiver's audible resolution, the nominal distance can be judged more accurately.

The position of a mobile phone can be determined using measurements which could be time, angular, Doppler measurements, etc. Naturally, the process differs from one wireless system to the next. In a Time of Arrival (TOA) network, the propagation time is measured between a mobile phone and a base station. In a Time Difference of Arrival (TDOA) network, the difference in the propagation time is measured between the mobile phone and two different base stations. In an Angle of Arrival (AOA) network, what is measured is the angle to the mobile phone relative to a certain direction from the base station. The measurements received from the base stations are then used to calculate the actual position of the mobile phone. This procedure uses a well known geometric equation called triangulation.

Cell coverage varies for various cellular systems and is overlapping. In many dense urban systems seven to eight cell sites cover a geographic point, in less dense areas three to four sites handle a call. The existing networks are therefore suited for our location systems, which must receive transmitted signal from multiple sites. FCC 911 Public Safety Answering Point (PSAP) requires 125 m and 65% accuracy AMPS cellular networks using AMPS standard "A" & "B" bands (416 channels, 30 khz wide 21 channels for control purposes and 395 for voice purposes). These systems use Reverse Control Channel RACH for mobile phone locations (with transmission of 10 kbytes/sec where the minimum time of one transmission tx=100 ms). RACH generally can support two to three transmissions per second. Reverse Control Channel RACH is also used for various other functions: ms registration, call origination, and call reception. All RACH messages are sent by conventional wire network to a MTSO mobile switching office. CDMA and TDMA standard protocols conforming to AMPS are also widely used in the USA with some differences. The GSM standard protocol is generally used in Europe and will not be generally considered for the inventive system.

The location and time data is sent from a computer that calculated the measurements according to a method appropriate for the cell phone network in question to the Moving Vehicle Speed Detection system, via a computer network adapter. The exemplary packet file containing this information is discussed above. It is conceived that the data is sent directly from a base station to the Moving Vehicle Speed Detection system or through one or more intermediary computers.

Despite some advanced modern technological systems that enable accurate cell phone location determination, some measurement errors in determining such a location are possible.

Due to measurement errors, recorded cell phone positions will generally not lay on the road the vehicle traveled on, but rather in the vicinity of it. To correct for this, the Positioning Algorithm disclosed in U.S. Pat. No. 6,577,946 assigned to the same assignee as the present invention, may be used for finding the most accurate positions of cell phones on road sections. This patent is entitled "Traffic Information Gathering via Cellular Phone Networks for Intelligent Transportation Systems" and is incorporated herein by reference. In brief, the Positioning Algorithm works as follows: Given a point (recorded cell phone position), the Positioning Algorithm searches for a point P nearest to point P' located on one of the closest road sections. Such a point is deemed to be the most probable position of the cell phone.

Figure 2:
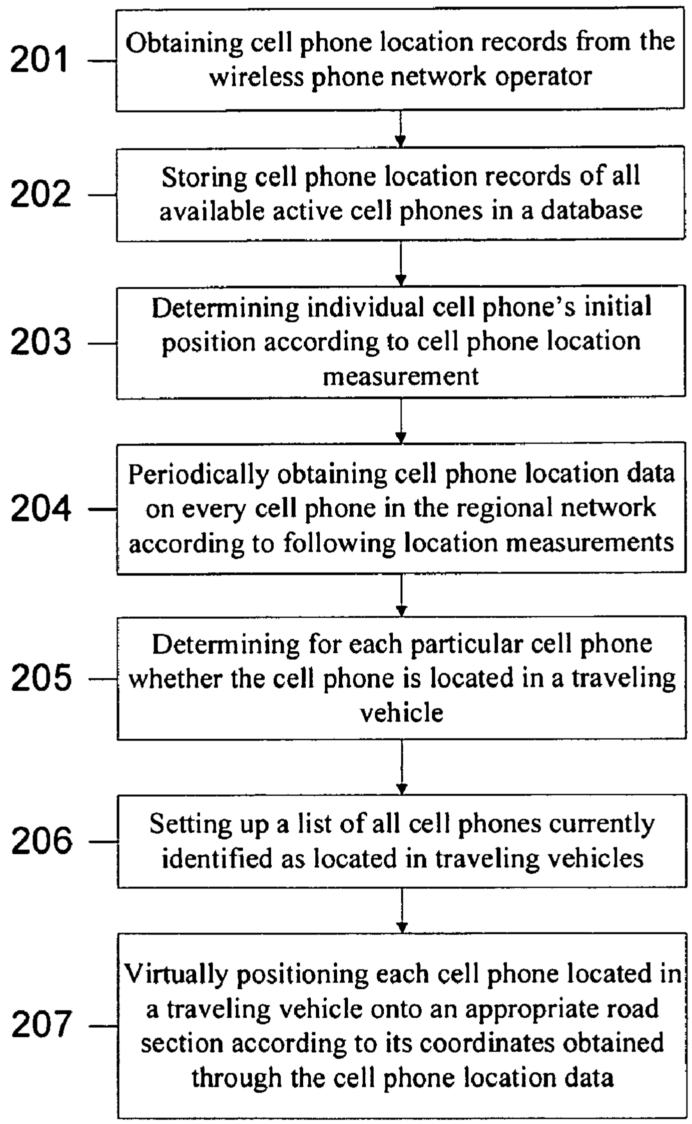
FIG. 2 illustrates a process of obtaining cell phone location measurements.
Figure 3:
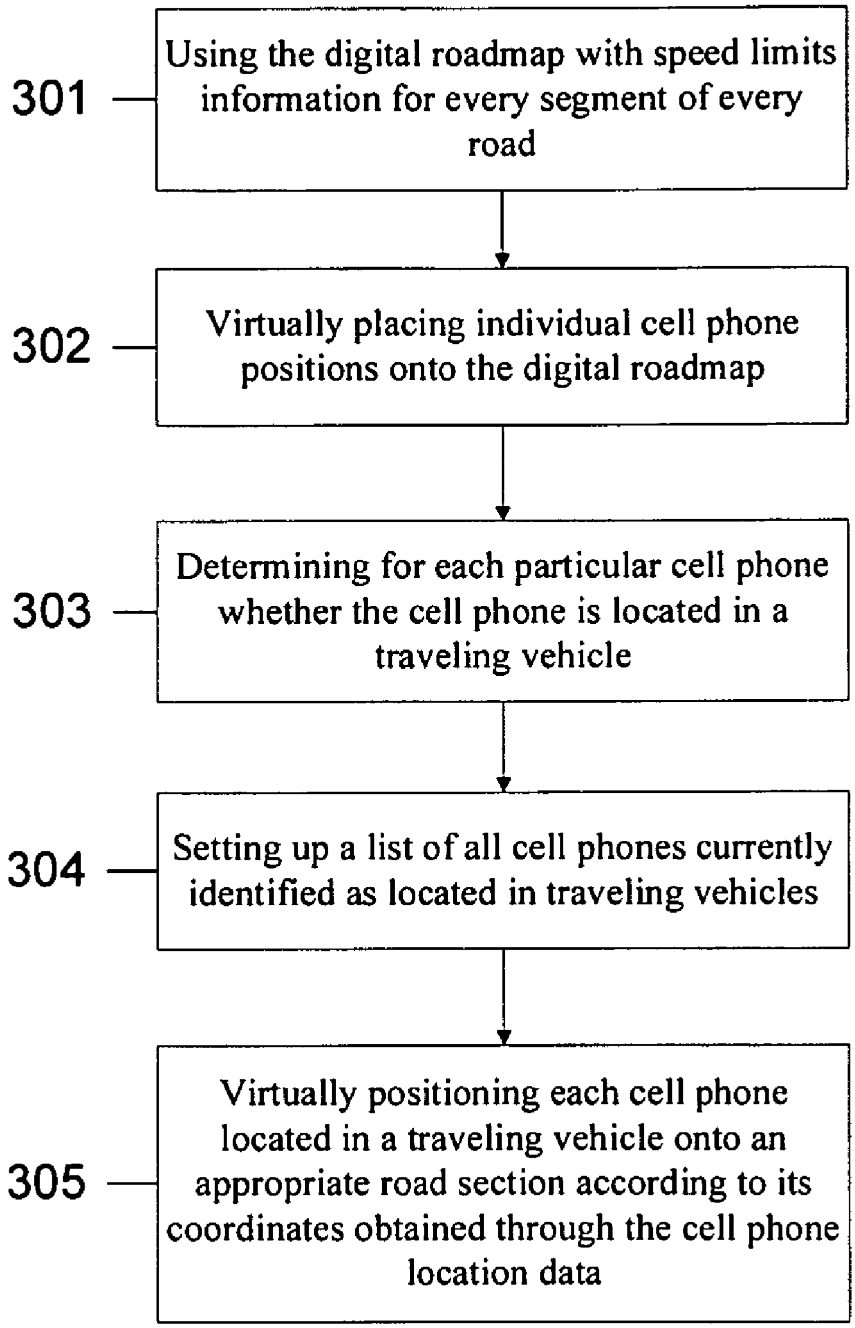
FIG. 3 presents a graphical overview of the use of a digital roadmap and a vehicle-type detection process.
Figure 4:
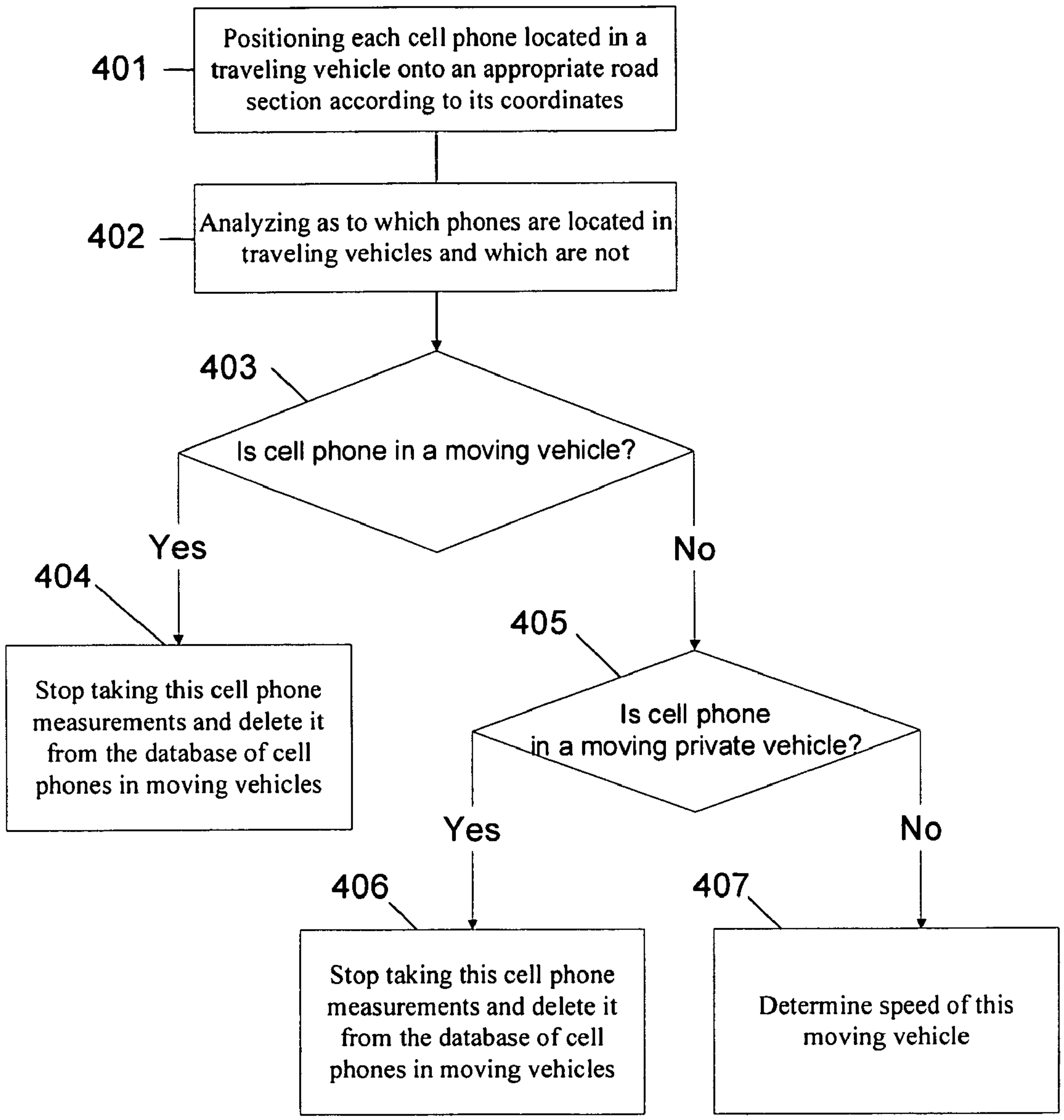
FIG. 4 shows detecting vehicles traveling over the speed limit.
Figure 5:
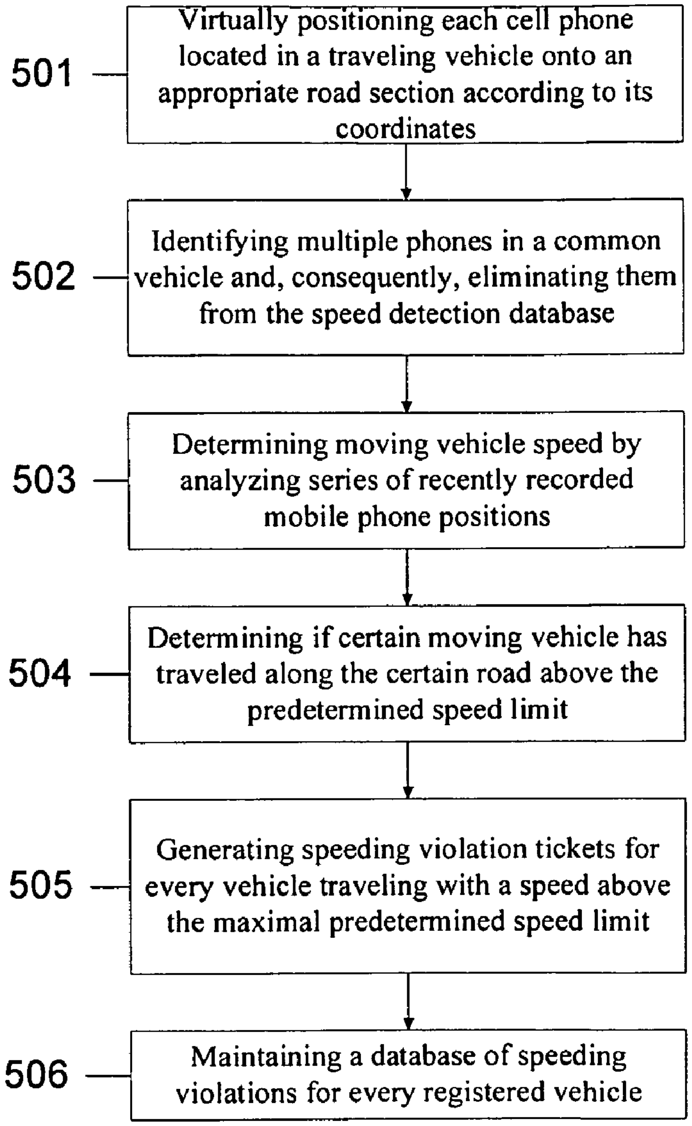
FIG. 5 provides a flowchart describing how the system separates between cell phones located in moving private vehicles and moving common vehicles.
Figure 6:
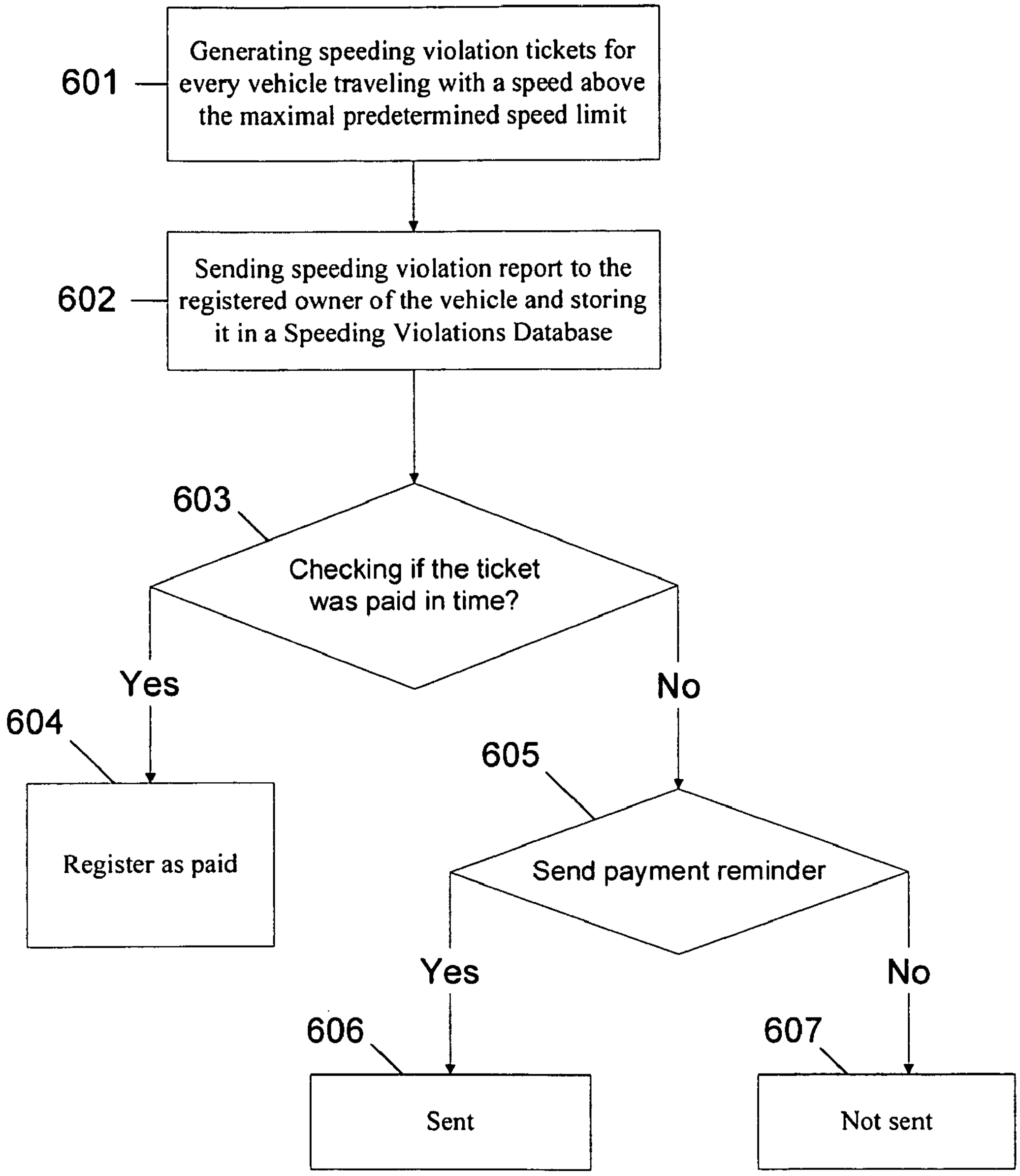
FIG. 6 provides a flowchart describing principles of a database of speeding violations.

After all recorded cell phone positions have been adjusted and associated with individual road sections, the adjusted phone list is created with all cell phones placed on road sections (207 in FIG. 2; 302 and 305 in FIG. 3; 401 in FIG. 4; 501 in FIG. 5).

Database: Creating and Storing the Current and Previous Cell Phone Lists

At the initial location measurement, a cell phone's location is stored into the database (202) and at each time period T, the system compiles a current phone list consisting of cell phone records (in the sense defined above) of all available active cell phones in a system database ordered by their ID reference numbers. At the next control period $T_{i+1}$, a new current phone list is compiled and recorded similarly, with the first current phone list becoming the previous phone list number 1. At the following control period, a new current phone list is compiled, the current phone list becomes the previous phone list number 1, and the previous phone list number 1 becomes the previous phone list number 2, etc.

Digital Roadmap and Creating Cell Phone Speed Records

As part of tracking the moving vehicles, we use a digital roadmap with speed limits information for segments of roads in the jurisdiction in which we are interested in detecting speed limit violations (301 in FIG. 3). The system would create a temporary cell phone path profile for each active cell phone in a given area and virtually position individual cell phone positions onto the digital map (207 in FIG. 2; 302 and 305 in FIG. 3; 401 in FIG. 4; 501 in FIG. 5). The digital map database contains a list of all road sections, each with a number of fixed attributes such as road name, the names of two adjacent intersection nodes, permissible speed, number of lanes, turns to and from the nodes, sensor devices if available, automatic traffic control signals, and other pertinent data. For each individual cell phone, we define its original location according to initial location measurements (203). The speed measurements are then made according to the cell phone's later recorded positions (204).

Separating Between Phones in Moving Vehicles and Other Phones

Once the list of all individual cell phones has been set up, it is analyzed as to which phones are located in traveling vehicles and which are not (205, 303, and 402). A list of cell phones currently identified as located in traveling vehicles will be compiled consequently (206 and 304).

In fact, phones located in traveling vehicles usually possess some attributes not found with other phones. As a result, some of these attributes can be used for separating phones located in moving vehicles, on the one hand, and all other phones on the other. Among those other phones may be stationary phones, such as for example phones inside houses and phones left in parked cars, slowly moving phones such as phones held by pedestrians, and fast moving phones located in trains. Roughly speaking, phones moving along discernible roads with speeds that, at least part of the time, are significantly greater than speeds of pedestrians should be classified as phones in moving vehicles. A formal and detailed discriminating procedure for performing this task may be found in the aforementioned U.S. Pat. No. 6,577,946 named "Traffic Information Gathering via Cellular Phone Networks for Intelligent Transportation Systemsm," the pertinent disclosure of which is hereby incorporated by reference.

As an example of such basic criteria for identifying phones in vehicles, we can enumerate the two following criteria:

1. cell phone location. I.e., a cell phone on a large road is probably a vehicle phone;

2. a cell phone traveling with a speed V larger than some critical speed, say, 6 miles/hour (10 km/hour) is a vehicle phone.

A list of cell phones located inside moving vehicles will be then compiled (403). Following that step, cell phone location identifiers will not be needed for the cell phones so determined to be not traveling in a moving vehicle (404).

On the next step, the system determines whether the cell phone is located in a moving private vehicle and moving common carrier vehicle (405 in FIG. 4; 502 in FIG. 5).

Separating Between Phones in Moving Private Vehicles and Common Moving Vehicles

Another important criterion employed in the present invention is one not mentioned in U.S. Pat. No. 6,577,946.

For further distinguishing between cell phone users traveling in their private cars and cell phone users traveling outside of their private cars, let's say, in public bus transportation, we define the following criterion: If the number of cell phones in a moving vehicle is larger than a certain parameter Max (let's say Max=2), then we determine that the cell phones are not in a private vehicle but rather a common vehicle, such as a bus or other public transportation common carrier.

Following this step, cell phone measurements will not be taken from the cell phones determined to be traveling inside the moving common vehicle (406).

Speed of cell phones located inside moving private vehicles will be measured to determine speed of the vehicle (407).

Determining Moving Vehicle Speed

By using the system defined above, we create a database of cell phones situated in moving private vehicles. The system, consequently, stores an ID of that particular cell phone in a database of moving private vehicles.

On the next step, the system checks the distance each moving vehicle has covered from time period $T_i$ to time period $T_{i+1}$.

For a particular moving private vehicle X, let's now denote that distance by $D^X_i$.

Let's now denote speed of the vehicle X by $V^X$ (503).

The speed V of moving vehicle X (in road segment between points i and i+1) is then determined by dividing $D_t$ by the time interval $(T_{i+1}-T)$ by:

$$V^X_{(i+1)}=D_t^X/(T_{i+1}-T_i).$$

Determining Speeding Violation by any of the Moving Vehicles

Furthermore, another database is used in the present system, which contains detailed speed-limit data corresponding to road sections of the digital map database.

Records obtained from the database of speed measurements and the database of speed limits for certain sections of road are then used together to compare actual speed data detected from a certain vehicle traveling along a certain road section against the maximum speed limit for that road section (504).

For example, we denote the speed limit for the road segment between points i and i+1 as $S_{(i+1)-i}$. Accordingly if any moving private vehicle X is traveling on that segment of road with the speed $V^X_{(i+1)-i}>S_{(i+1)-i}$ then a speeding ticket will be generated by the speeding-ticket-generation module (4) as the system in the presently-described embodiment of this invention also includes a module for generating speeding violation tickets and sending them to the respective registered owners of the vehicles that committed the speeding violation.

For privacy reasons, the inventive system may be operated in a way that location information will be received from a cellular network operator in an anonymous and/or encrypted way, and that the system will keep records of only those drivers that committed traffic violations.

Speeding Violations Database

Speeding violations data from the module for generating speeding violation tickets (505 is stored in a Speeding Violations Database (506). The database will be maintained by the user of the invention (e.g. police/law enforcement agencies). For each vehicle registered in the system, it desirably includes the following information:

date of speeding violation ticket (601);

date of sending speeding violation ticket (602);

number of miles (kilometers) that the vehicle has traveled for each speeding violation case for each vehicle;

total number of speeding violations for each registered vehicle in the database;

whether or not the speeding ticket has been settled (the monetary fine was paid in time) (603, 604);

in the case of an unsettled speeding ticket, the system will send a reminder to the registered owner of the vehicle demanding payment (605, 606 and 607).

2. Vehicle Speed Calculation Through Wireless Handoff Points Measurements

Figure 7A:
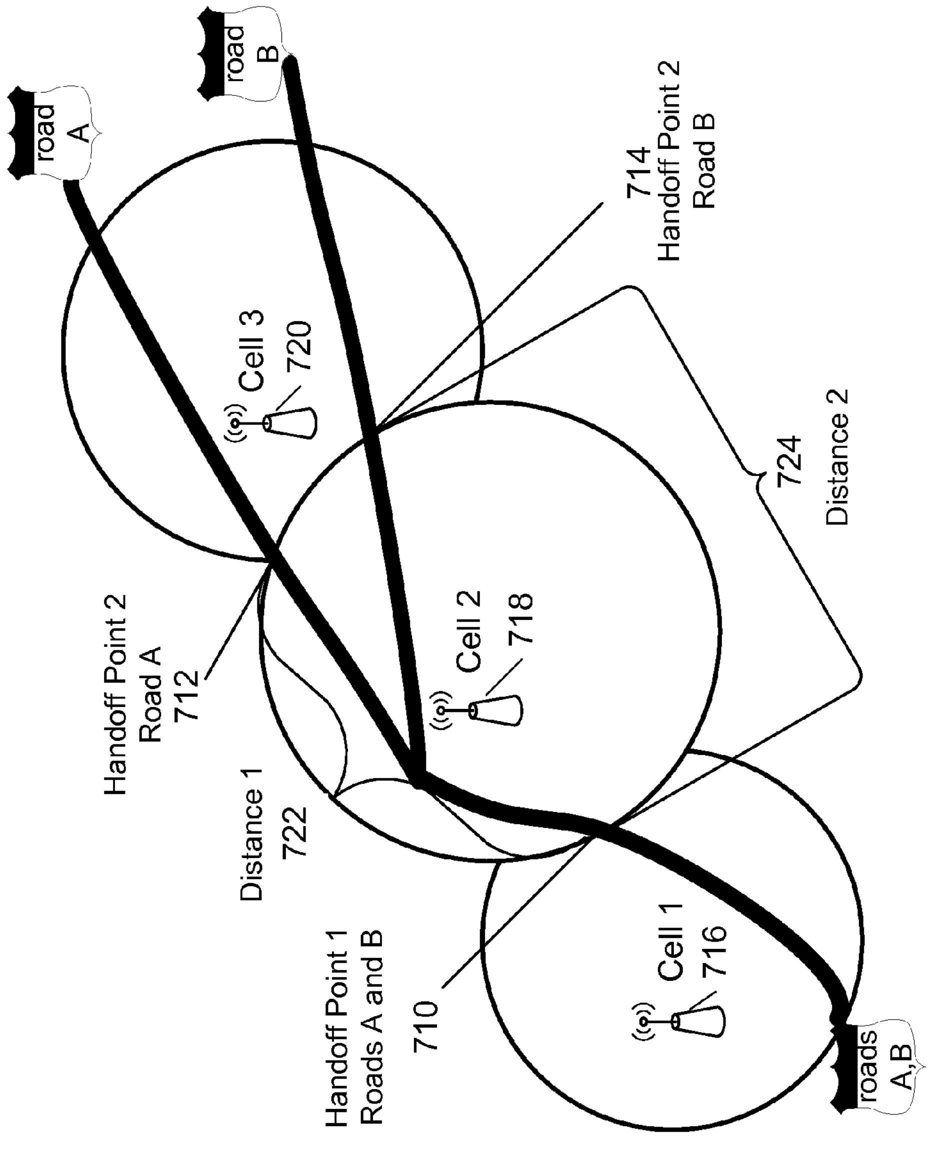
FIG. 7*a* provides a flowchart describing the base station handoff process from one cell to the next.

Another way to provide precise location information is by measuring entry and exit points (handoff points 710, 712, and 714 in FIG. 7*a*) from/to geographical coverage areas of different cells (716, 718, and 720 in FIG. 7*a*) in a cellular communication network (graphically presented in FIG. 7*a*).

In general, an entire coverage area of a cellular telecommunications network is divided into several cells (716, 718, and 720 in FIG. 7*a*) when mobile phones communicate with the base station which lies in the center of its signal territory (i.e., a cell). Geometrically, the cell is a hexagonal area whose size increases or decreases depending on the number of mobile devices in it.

Basically, cellular telecommunications systems comprise a plurality of mobile units (mobile phones) communicating with one or more base stations, wherein the signal transmitted by a given mobile phone when in a particular location is received by a certain base station. Each base station covers a cell within which a mobile unit may communicate. Each cell covers a certain geographic area and routes calls from mobile phones to and from a telecommunications network via a mobile switching center.

When any mobile phone enters the cell, it registers itself with the base station by a process called handoff. When a mobile phone has moved certain distance (722 and 724 in FIG. 7*a*) from a first cell to a second cell, the signal level of the first cell is much lower than the signal level of the second cell, and due to this condition, a handoff is performed to assign new system resources associated with the second cell. Such a handoff involves the execution of a set of specific handoff instructions between the mobile phone and one or more base stations and/or mobile switching centers. Cellular telecommunications systems generally perform timely handoff procedures to maximize the utilization of system resources.

Handoff Optimization

In the present invention, timely handoff is crucial in order to provide precise handoff time/position measurements. A number of hardware products exist in the market to improve and optimize such a handoff.

Another challenge of handoff optimization is in minimizing a "no-coverage" area of the cell phones.

In this method, the system checks when a mobile phone exits one cell's area and enters another cell's area.

Technologically, this may be achieved by measuring the distances signals travel to base stations, and the times these signals take to travel. This information may then be applied to mathematical and statistical methods to solve the resulting equations.

This approach takes advantage of improved accuracy of location measurement methods. Furthermore, any necessary modifications, such as specialized location equipment, can be made on the network rather than on the handsets.

One of those products is the Agilent Wireless Network Optimization Platform which allows optimized base station and network deployments in a way that makes the wireless handoff process smoother. This platform also helps network equipment manufacturers and service providers identify interference issues and neighboring cell site configuration problems in wireless broadband data networks.

This platform also performs several optimization functions based on system performance analysis and modeling of system behavior in response to topological info (e.g. morphology data, MS and base station based measurements). A handoff point can change according to such conditions.

Using an Agilent system makes wireless handoff smoother by modification of handoff parameters to force handoff to neighbor cells with minimal loss of information.

Another product that can be used to enable a smooth handoff was developed by Ericsson. It is called the Ericsson TEMS CellPlanner. Using a CellPlanner enables wireless network operators to plan and optimize wireless networks during the network development stage. Using this product will minimize a "no-coverage" area and optimize the handoff process as well.

Finding the Nominal Distance Between Base Stations

The base stations are placed generally equidistantly from one another along two or more generally parallel and straight lines, wherein mutual displacement of base stations along adjacent lines corresponds essentially to half the distance between two base stations that are located on one and the same line.

The distance between base stations is known in the to the cellular phone operator. Using such pre-determined distances, and using the handoff point, the cellular phone operator registers when a cell phone has switched from an area of one base station to an area of another base station.

Determining Handoff Point

When the mobile phone moves from one cell to the next, the communication link is transferred from its current base station to a neighboring base station using a handoff procedure. The need for handoff is usually determined based on the received signal strength of the mobile phone at the base station and the distance from the current base station, as determined by the round-trip time for signals to and from the mobile phone and the bit error rate.

Measurements on the uplink and downlink between the mobile phone and the base station are continuously taken, and received signal levels (strength) and time measurements are taken on the round trip time. When those values exceed predetermined thresholds, the handoff process from one base station to the other is initiated.

Additionally, the system checks a number of factors in relation to the signal levels (strength) from a number of neighbor cells, and handoff is initiated if the signal level of one of the neighboring cells is much higher than the signal level of the current cell.

In case there are multiple base stations in the proximity of a particular mobile phone (i.e. basically, when there are two base station antennas that are transmitting a signal of equal power to the phone), the primary base station of the cell is the one in which the mobile phone is situated and the secondary base station is the neighboring cell that the mobile phone is approaching.

Steps of Obtaining the Location Measurements:

This method, in which the location data measurements are obtained through the wireless handoff optimization measurements, comprises the steps of:

a. creating a list of cell phones located at each cell of a wireless network;

b. determining, for each cell phone in the list of step "a," when the cell phone has moved from one cell in the wireless network to another cell in the wireless network, i.e. performed a handoff process;

c. determining, for a cell phone in the list of step "a," the time of a handoff process following the handoff process of step "b";

d. for a cell phone in the list that performed the handoff processes of steps "b" and "c," virtually positioning the cell phone onto each of all road sections that the cell phone could have been located on between points at which the handoff processes of steps "b" and "c" could have occurred. Let us assume that we have two roads: Road A and road B in the area covered by cells 1, 2, 3 (716, 718, and 720 in FIG. 7*a*);

e. for a cell phone in the list that performed the handoff processes of steps "b" and "c," determining the distances between all points where the handoffs of "b" and "c" could have occurred along the road sections of step "d." See item 701 in FIG. 7*b;* for a cell phone in the list that performed the handoff processes of steps "b" and "c," obtaining from a speed limits database (SL1, SL2 from FIG. 7*b*. block 702) the maximum speed limit for the road sections of step "d";

g. obtaining a number representing the minimum length of time in which the moving vehicle corresponding to a cell phone of step "f" could travel the distance between two handoff points of step "e" in compliance with said maximum speed limits, wherein the number is obtained from a real-time calculation of the minimum ratio of the distances of step "e" to the maximum speed limits of step "f," or from a database containing the pre-calculated result of said calculation. With reference to the figures, the calculation involves determining the ratios D1/SL1 and D2/SL2 from FIG. 7*b*., block 703 and determining if D1/SL1>D2/SL2 (704);

h. comparing the actual time between handoffs in steps "b" and "c" with the minimum length of time of step "g" to determine if the moving vehicle is traveling at a speed above a corresponding maximum speed limit;

i. identifying cell phones that are grouped together in a single moving vehicle and eliminating those cell phones from the list;

j. for a vehicle corresponding to a cell phone in the list and traveling at a speed above a corresponding maximum speed limit, generating a speeding violation ticket; and k. maintaining a database of speeding violations for a vehicle of step "j" that is registered, determining if a certain speeding ticket has not been paid in time, and sending a request to settle the ticket.

Driving-while-Speaking Violations

For every cell phone for which a speeding violation has occurred, the system also checks if the wireless system customer was managing an active phone call while driving over the speed limit. This is done by checking if the speech connection between two or more subscribers is established and where one of the subscribers is the customer in subject. It is a general principle in wireless networks that call establishment takes place under the actual speech connection (i.e., the actual speech connection is switched from one piece of terminal equipment to another in said network/networks via a service switching function).

If, during the time of a speeding violation, the system also detects that the same cell phone was in an active call mode, the system generates another driving violation ticket for a driving-while-speaking violation.

The said violation ticket will then be registered in the traffic violations database.

The foregoing description of embodiments of the invention is by way of example and should not be construed to exclude variations consistent with the spirit of the invention. It is to be understood that some or all of the calculations and algorithms disclosed would be performed in a computer containing a central processing unit, memory containing computer-readable instructions for executing the calculations and algorithms, memory for storing data and results of calculations, and at least one network adapter for communicating through a wired or wireless network. It is also to be understood that all lists referenced in the above description would be represented in the memory of a computer, for example as data stored in an array of contiguous data or in list item data structures containing item information and one or more pointers to other list items. It should also be understood that all databases could be stored in relational format and maintained and accessed with an SQL engine, such as Microsoft SQL Server, or another available means. One alternative is that the database may be stored in a file in a flat format and be maintained and accessed directly by a computer without an SQL engine.

I claim:

1. A method for detecting the speed of a moving vehicle through measurements of cellular phone location data obtained through wireless handoff optimization measurements at specific time intervals, and determining if the vehicle's speed is above a maximum speed limit for any particular section of a road, comprising:

a) generating a list of cell phones located at each cell of a wireless network;

b) determining, for a cell phone in the list of step a), when the cell phone has performed a handoff process due to moving from one cell in the wireless network to another cell in the wireless network;

c) determining, for a cell phone in the list of step a), the time of a handoff process following the handoff process of step b);

d) for a cell phone in the list that performed the handoff processes of steps b) and c), virtually positioning the cell phone onto each of all road sections that the cell phone could have been located on between points at which the handoff processes of steps b) ands c) could have occurred;

e) for a cell phone in the list that performed the handoff processes of steps b) and c), determining the distances between all points where the handoffs of steps b) and c) could have occurred along the road sections of step d);

f) for a cell phone in the list that performed the handoff processes of steps b) and c), obtaining from a speed limits database the maximum speed limit for the road sections of step d);

g) obtaining a number representing the minimum length of time in which the moving vehicle corresponding to a cell phone of step f) could travel the distance between two handoff points of step e) in compliance with said maximum speed limits, wherein the number is obtained from a real-time calculation of the minimum ratio of the distances of step e) to the maximum speed limits of step f), or from a database containing the pre-calculated result of said calculation;

h) comparing the actual time between handoffs in steps b) ands c) with the minimum length of time of step g) to determine if the moving vehicle is traveling at a speed above a corresponding maximum speed limit;

i) identifying cell phones that are grouped together in a single moving vehicle and eliminating those cell phones from the list;

j) for a vehicle corresponding to a cell phone in the list and traveling at a speed above a corresponding maximum speed limit, generating a speeding violation ticket; and k) maintaining a database of speeding violations for a vehicle of step j) that is registered, determining if a certain speeding ticket has not been paid in time, and sending a request to settle the ticket.

2. A method according to claim 1, wherein the vehicle speed data is wirelessly transmitted to a law enforcement agency.

3. A method according to claim 1, further comprising recording corresponding cell phone number, license plate number, formal vehicle registration number, or vehicle identification number of a vehicle containing a cell phone and traveling at a speed above a corresponding maximum speed limit, and keeping such a record for a period of time.

4. A method according to claim 1, further comprising sending the speeding violation ticket to the registered owner of the corresponding vehicle, and keeping a record of sending the speeding ticket for a period of time.

5. A method according to claim 1, further comprising checking if a driver of a car that committed a speeding violation was also speaking on a phone in the same time period in which the driver committed a speeding violation, and generating a driving-while-speaking traffic violation ticket for the driver.

6. A system for detecting the speed of a moving vehicle through measurements of cellular phone location data obtained through wireless handoff optimization measurements at specific time intervals, and determining if the vehicle's speed is above a maximum speed limit for any particular section of a road, comprising:

a) means for generating a list of cell phones located at each cell of a wireless network;

b) means for determining, for a cell phone in the list of step a), when the cell phone has performed a handoff process due to moving from one cell in the wireless network to another cell in the wireless network;

c) means for determining, for a cell phone in the list of part a), the time of a handoff process following the handoff process of step b);

d) means for, for a cell phone in the list that performed the handoff processes of steps b) and c), virtually positioning the cell phone onto each of all road sections that the cell phone could have been located on between points at which the handoff processes of steps b) and c) could have occurred;

e) means for, for a cell phone in the list that performed the handoff processes of steps b) and c), determining the distances between all points where the handoffs of steps b) and c) could have occurred along the road sections of step d);

f) means for, for a cell phone in the list that performed the handoff processes of steps b) and c), obtaining from a speed limits database the maximum speed limit for the road sections of steps d);

g) means for obtaining a number representing the minimum length of time in which the moving vehicle corresponding to a cell phone of step f) could travel the distance between two handoff points of step e) in compliance with said maximum speed limits, wherein the number is obtained from a real-time calculation of the minimum ratio of the distances of step e) to the maximum speed limits of step f), or from a database containing the pre-calculated result of said calculation;

h) means for comparing the actual time between handoffs in steps b) and c) with the minimum length of time of step g) to determine if the moving vehicle is traveling at a speed above a corresponding maximum speed limit;

i) means for identifying cell phones that are grouped together in a single moving vehicle and eliminating those cell phones from the list;

j) means for, for a vehicle corresponding to a cell phone in the list and traveling at a speed above a corresponding maximum speed limit, generating a speeding violation ticket; and k) means for maintaining a database of speeding violations for a vehicle of step j) that is registered, determining if a certain speeding ticket has not been paid in time, and sending a request to settle the ticket.

7. A system according to claim 6, further comprising means for wirelessly transmitting vehicle speed data.

8. A system according to claim 6, further comprising means for recording corresponding cell phone number, license plate number, formal vehicle registration number, or vehicle identification number of a vehicle containing a cell phone and traveling at a speed above a corresponding maximum speed limit, and keeping such a record for a period of time.

9. A system according to claim 1, further comprising means for sending the speeding violation ticket to the registered owner of the corresponding vehicle, and keeping a record of sending the speeding ticket for a period of time.

10. A system according to claim 1, further comprising means for checking if a driver of a car that committed a speeding violation was also speaking on a phone in the same time period in which the driver committed a speeding violation, and generating a driving-while-speaking traffic violation ticket for the driver.

11. A method for detecting the speed of a moving vehicle through measurements of cellular phone location data obtained through wireless handoff optimization measurements at specific time intervals, and determining if the vehicle's speed is above a maximum speed limit for any particular section of a road, comprising:

a) generating a list of cell phones located at each cell of a wireless network;

b) determining, for a cell phone in the list of step a), when the cell phone has performed a handoff process due to moving from one cell in the wireless network to another cell in the wireless network;

c) determining, for a cell phone in the list of step a), the time of a handoff process following the handoff process of step b);

d) for a cell phone in the list that performed the handoff processes of steps b) ands c), virtually positioning the cell phone onto each of all road sections that the cell phone could have been located on between points at which the handoff processes of steps b) and c) could have occurred;

e) for a cell phone in the list that performed the handoff processes of steps b) ands c), determining the distances between all points where the handoffs of steps b) and c) could have occurred along the road sections of step d);

f) for a cell phone in the list that performed the handoff processes of steps b) and c), obtaining from a speed limits database the maximum speed limit for the road sections of step d);

g) obtaining a number representing the minimum length of time in which the moving vehicle corresponding to a cell phone of step f) could travel the distance between two handoff points of step e) in compliance with said maximum speed limits, wherein the number is obtained from a real-time calculation of the minimum ratio of the distances of step e) to the maximum speed limits of step f), or from a database containing the pre-calculated result of said calculation;

h) comparing the actual time between handoffs in steps b) and c) with the minimum length of time of step g) to determine if the moving vehicle is traveling at a speed above a corresponding maximum speed limit;

i) identifying cell phones that are grouped together in a single moving vehicle and eliminating those cell phones from the list;

j) for a vehicle corresponding to a cell phone in the list and traveling at a speed above a corresponding maximum speed limit, adding a corresponding cell phone number, license plate number, formal vehicle registration number, or vehicle identification number of the vehicle to a list representing speeding vehicles; and k) transmitting said list of speeding vehicles to a third party.

12. A system for detecting the speed of a moving vehicle through measurements of cellular phone location data obtained through wireless handoff optimization measurements at specific time intervals, and determining if the vehicle's speed is above a maximum speed limit for any particular section of a road, comprising:

a) means for generating a list of cell phones located at each cell of a wireless network;

b) means for determining, for a cell phone in the list of step a), when the cell phone has performed a handoff process due to moving from one cell in the wireless network to another cell in the wireless network;

c) means for determining, for a cell phone in the list of step a), the time of a handoff process following the handoff process of step b);

d) means for, for a cell phone in the list that performed the handoff processes of steps b) and c), virtually positioning the cell phone onto each of all road sections that the cell phone could have been located on between points at which the handoff processes of steps b) and c) could have occurred;

e) means for, for a cell phone in the list that performed the handoff processes of steps b) and c), determining the distances between all points where the handoffs of steps b) and c) could have occurred along the road sections of step d);

f) means for, for a cell phone in the list that performed the handoff processes of steps b) and c) obtaining from a speed limits database the maximum speed limit for the road sections of steps d);

g) means for obtaining a number representing the minimum length of time in which the moving vehicle corresponding to a cell phone of step f) could travel the distance between two handoff points of step e) in compliance with said maximum speed limits, wherein the number is obtained from a real-time calculation of the minimum ratio of the distances of step e) to the maximum speed limits of step f) or from a database containing the pre-calculated result of said calculation;

h) means for comparing the actual time between handoffs in steps b) and c) with the minimum length of time of step g) to determine if the moving vehicle is traveling at a speed above a corresponding maximum speed limit;

i) means for identifying cell phones that are grouped together in a single moving vehicle and eliminating those cell phones from the list;

j) means for, for a vehicle corresponding to a cell phone in the list and traveling at a speed above a corresponding maximum speed limit, adding a corresponding cell phone number, license plate number, formal vehicle registration number, or vehicle identification number of the vehicle to a list representing speeding vehicles; and k) means for transmitting said list of speeding vehicles to a third party.

* * * * *